US009426253B2

(12) United States Patent
Jun et al.

(10) Patent No.: US 9,426,253 B2
(45) Date of Patent: Aug. 23, 2016

(54) METHOD FOR RE-ENABLING A DISABLED CAPABILITY OF A TERMINAL AND A DEVICE MANAGEMENT SYSTEM FOR THE SAME

(75) Inventors: Hae-Young Jun, Anyang-si (KR); Ji-Eun Keum, Suwon-si (KR); Wuk Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1599 days.

(21) Appl. No.: 12/020,125

(22) Filed: Jan. 25, 2008

(65) Prior Publication Data

US 2008/0184261 A1    Jul. 31, 2008

(30) Foreign Application Priority Data

Jan. 25, 2007  (KR) ................. 10-2007-0008100

(51) Int. Cl.
 G06F 9/44 (2006.01)
 H04L 29/08 (2006.01)
 H04L 12/24 (2006.01)
(52) U.S. Cl.
 CPC ............ *H04L 67/34* (2013.01); *H04L 41/12* (2013.01); *H04L 67/303* (2013.01)
(58) Field of Classification Search
 None
 See application file for complete search history.

(56) References Cited

U.S. PATENT DOCUMENTS

| 5,524,209 A | 6/1996 | Parker et al. |
| 6,363,421 B2 | 3/2002 | Barker et al. |
| 6,643,517 B1 * | 11/2003 | Steer ..................... 455/456.4 |
| 2003/0081621 A1 * | 5/2003 | Godfrey et al. ............. 370/400 |
| 2003/0093519 A1 | 5/2003 | Jackson et al. |
| 2004/0005876 A1 * | 1/2004 | Tuoriniemi .................. 455/411 |
| 2004/0198306 A1 * | 10/2004 | Singh et al. .................. 455/345 |
| 2005/0010585 A1 * | 1/2005 | Sahinoja et al. ............. 707/100 |
| 2005/0033693 A1 * | 2/2005 | Toiminen ...................... 705/43 |
| 2005/0060361 A1 * | 3/2005 | Chatrath et al. ............. 709/200 |
| 2005/0181836 A1 * | 8/2005 | Kamat .......................... 455/567 |
| 2005/0182697 A1 * | 8/2005 | Rao ................................ 705/28 |
| 2005/0228847 A1 * | 10/2005 | Hayes, Jr. .................... 709/200 |
| 2005/0265382 A1 * | 12/2005 | Hartikainen ................. 370/465 |
| 2005/0277428 A1 * | 12/2005 | Nathan Brown ........... 455/456.3 |
| 2006/0015626 A1 * | 1/2006 | Hallamaa et al. ............ 709/229 |

(Continued)

FOREIGN PATENT DOCUMENTS

| JP | 2004-120736 A | 4/2004 |
| KR | 10-0653207 B1 | 11/2006 |

(Continued)

OTHER PUBLICATIONS

Open Mobile Alliance, XP 002684175, Device Capability Management Object Requirements, Jan. 19, 2007, pp. 2-18.

*Primary Examiner* — Shih-Wei Kraft
(74) *Attorney, Agent, or Firm* — Jefferson IP Law, LLP (57) ABSTRACT

Provided is a method for enabling a capability of a terminal in a device management system including a server capable of at least one of enabling and disabling capabilities of the terminal. The method includes the step of determining if a condition has been met for requesting enablement of a disabled capability of the terminal. The method further includes the step of transmitting a request message to the server including information related to the condition being met, based on a determination that the condition has been met. The method further includes the step of receiving a control command for the disabled capability from the server to process the control command.

11 Claims, 6 Drawing Sheets

(56) References Cited

U.S. PATENT DOCUMENTS

| | | | |
|---|---|---|---|
| 2006/0039561 A1* | 2/2006 | Ypya et al. | 380/270 |
| 2006/0094415 A1* | 5/2006 | Veron | 455/419 |
| 2006/0099965 A1* | 5/2006 | Aaron | 455/456.3 |
| 2006/0129414 A1* | 6/2006 | Hallamaa et al. | 705/1 |
| 2006/0200658 A1* | 9/2006 | Penkethman | 713/2 |
| 2006/0200814 A1* | 9/2006 | Kontinen et al. | 717/168 |
| 2006/0205394 A1* | 9/2006 | Vesterinen | 455/418 |
| 2006/0262743 A1* | 11/2006 | Kalhan et al. | 370/328 |
| 2007/0027971 A1* | 2/2007 | Marolia et al. | 709/223 |
| 2007/0158404 A1* | 7/2007 | Li et al. | 235/375 |
| 2007/0174467 A1* | 7/2007 | Ballou et al. | 709/227 |
| 2007/0198975 A1* | 8/2007 | Alnas et al. | 717/168 |
| 2007/0200665 A1* | 8/2007 | Studerus | 340/5.61 |
| 2008/0239965 A1 | 10/2008 | Tang | |

FOREIGN PATENT DOCUMENTS

| | | |
|---|---|---|
| WO | 2006/122477 A1 | 11/2006 |
| WO | 2007/084958 A1 | 7/2007 |

* cited by examiner

```
<Alert>
   <Cmd ID>2</Cmd ID>
   <Data>1226</Data>    <!--Generic Alert-->
   <Item>
      <Source><LocURI>./SyncML/Sample</LocURI></Source>
      <Meta>
         <Type xmlns="syncml:metinf">
            Reversed-Domain-Name: org.domain.samplealert
         </Type>
         <Format xmlns="syncml:metinf">xml</Format>
      </Meta>
      <Data>
         <!-- Client Alert Data (USE PREVIOUS DETERMINED DATA VALUE FOR
               SPECIFIC MESSAGE USED IN SPECIFIC ENABLER) -->>

</Data>
   </Item>
</Alert>
```

METHOD FOR RE-ENABLING A DISABLED CAPABILITY OF A TERMINAL AND A DEVICE MANAGEMENT SYSTEM FOR THE SAME

PRIORITY

This application claims the benefit under 35 U.S.C. §119(a) of a Korean patent application filed in the Korean Industrial Property Office on Jan. 25, 2007 and assigned Serial No. 2007-8100, the entire disclosure of which is hereby incorporated by reference.

BACKGROUND OF THE INVENTION

1. Field of the Invention

The present invention relates to a wireless terminal including a device management (DM) system. More particularly, the present application relates to a wireless terminal including a device management (DM) system in which a server remotely manages the wireless terminal and a DM client.

2. Description of the Related Art

There have been technologies developed with respect to Open Mobile Alliance (OMA) Device Management (DM) for remotely managing numerous terminals connected to a wireless network. Many of these technologies have been standardized by the OMA. In a DM system, a DM server remotely transfers a DM message to a terminal using a DM protocol and acquires, replaces and executes a Management Object (MO) representing a parameter, an execution file, or the like, in the terminal, so as to manage the downloading/updating of firmware, downloading/installing/updating/removing of a software component, or the like. One of the functions of the DM server is device capability management. Device capability management involves the authorization of the use of one or more specific capabilities of the terminal, e.g., a camera function, LAN, GPS, DMB, or the like.

Device capability management is a method in which a management authority can limit or authorize capabilities, e.g., a camera function, WLAN, Bluetooth, or the like, of the wireless terminal coming into and out of a specific control area.

To this end, a Device Capability Management Object (DCMO) is defined, which represents an execution node, or the like, in which a set value related to the capability of the terminal is stored. The DM server acquires, replaces, or executes a value of the node of the DCMO so that it can limit the specific capability of the terminal.

For example, the DM server executes the execution node, such as enabling, disabling, or the like, that is a sub-node of a camera node, or replaces the value of an enable node with TRUE, FALSE, or the like, so as to enable or disable the camera function. In this case, the DM server does not provide a client with the authorization for re-enabling a corresponding function, and the corresponding function can be re-enabled only through the DM server.

That is, the corresponding function can only be enabled/disabled when a Management Authority (MA) server transfers an enablement/disablement command of the specific capability to the corresponding terminal using location information, admission information of the terminal, or the like. Therefore, a user of the terminal should wait for the enablement command with respect to the corresponding capability from the DM server in order to use the specific capability disabled by the DM server.

In practice, the DM system checks for the admission of the wireless terminal into the control area automatically or passively to obtain admission information of the terminal. The DM server then transfers the command for disabling or enabling the capability of the terminal to the terminal. For example, a device capability management system checks an identification of the user at an entrance of a specific security area and transfers the information to the MA server so that the MA server can disable or enable the specific capability of the registered wireless terminal of the corresponding user through the DM server. Further, the DM system registers information on the wireless terminal of a visitor upon entering the specific security area, the MA server disables the specific capability of the terminal through the DM server using the corresponding information. Still further, the DM system checks for a visitor's departure from the specific security area, so as to transfer to the terminal the command for re-enabling the specific capability.

However, there may occur a situation where the admission information of the user fails to be automatically registered due to a check error, or the like. Further, in the case of passively checking, when the terminal leaves the corresponding area and the terminal's departure fails to be registered in the registering location, or when other wireless related errors occur, the DM server cannot establish a DM session with the client of the terminal. When the DM server cannot establish a DM session with the client of the terminal it may faill to transfer the enablement command for the corresponding capability to the wireless terminal. In this case, even though the corresponding terminal moves out of the control area, the specific capability of the terminal may be maintained in its disabled state. At this time, if the user has to use the corresponding capability, the user does not have authorization for re-enabling the corresponding capability. Accordingly, the user will not be able to use the corresponding capability until the DM server establishes the DM session again and transfers the enablement command.

Further, a situation may occur where use of the specific capability, e.g., a camera function, is temporarily required for professional reasons, or the like, even when the terminal is located in the control area. In this situation, a temporary authorization for enabling the specific capability should be provided to the user. However, it is inconvenient for a user to input the registration information of the user's terminal required to enable the corresponding capability with the DM system to enable the specific capability of the corresponding terminal. Specifically, when this situation occurs, and the particular person manages many terminals, there is even greater inconvenience.

Thus, when the DM system fails to detect the terminal's departure from the control area, the DM server cannot re-enable the disabled capabilities of the terminal. Accordingly, the user will not be able to use the corresponding capability. Further, when it is necessary for the user to use the disabled capability, there is no method for the user to enable the corresponding capability before the DM server provides the corresponding terminal with the enablement command even when the wireless terminal is within the control area.

SUMMARY OF THE INVENTION

An aspect of the present invention is to address at least the above-mentioned problems and/or disadvantages and to provide at least the advantages described below. Accordingly, an aspect of the present invention is to provide a method and a device for transmitting a request for use authorization of a specific capability of a terminal to the terminal.

In accordance with an aspect of the present invention, a method for enabling a capability of a terminal in a device management system including a server capable of at least one of enabling and disabling capabilities of the terminal is provided. The method includes the step of determining if a condition has been met for requesting enablement of a disabled capability of the terminal. The method further includes the step of transmitting a request message to the server including information related to the condition being met, based on a determination that the condition has been met. The method further includes the step of receiving a control command for the disabled capability from the server to process the control command.

In accordance with another aspect of the present invention, a device management system for enabling a capability of a terminal is provided. The system includes a server for at least one of enabling and disabling capabilities of the terminal. In addition, the system includes the terminal for transmitting a request message including information related to an enablement request to the server when a condition has been met for requesting enablement of a disabled capability, for receiving a control command for the disabled capability from the server, and for processing the control command.

In accordance with yet another aspect of the present invention, a terminal for enabling a disabled capability in a device management system including a server for at least one of enabling and disabling capabilities of the terminal is provided. The terminal includes a device capability enablement determining unit for determining if a condition has been met for requesting enablement of the disabled capability of the terminal. The terminal further includes a DM client for receiving a notification of the condition being met for requesting enablement of the disabled capability from the device capability enablement determining unit when the condition has been met, for generating a request message including information related to the condition being met, and for transmitting the generated request message to the server.

In accordance with yet another aspect of the present invention, a server for managing a capability of a terminal in a device management system is provided. The server includes an enablement request processing unit for receiving a request message requesting an enablement of a capability of the terminal from the terminal. The server further includes a device capability at least one of enablement and disablement determining unit for determining whether or not to enable the capability when receiving the request message. The server also includes a device capability at least one of enablement and disablement commanding unit for generating a command for controlling the capability based on a determination result in the device capability at least one of enablement and disablement determining unit regarding whether or not to allow the enablement of the capability, to transmit the generated command to the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numerals are used to depict the same or similar elements, features and structures.

DETAILED DESCRIPTION OF EXEMPLARY EMBODIMENTS

In the following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations are omitted for clarity and conciseness.

Figure 1:
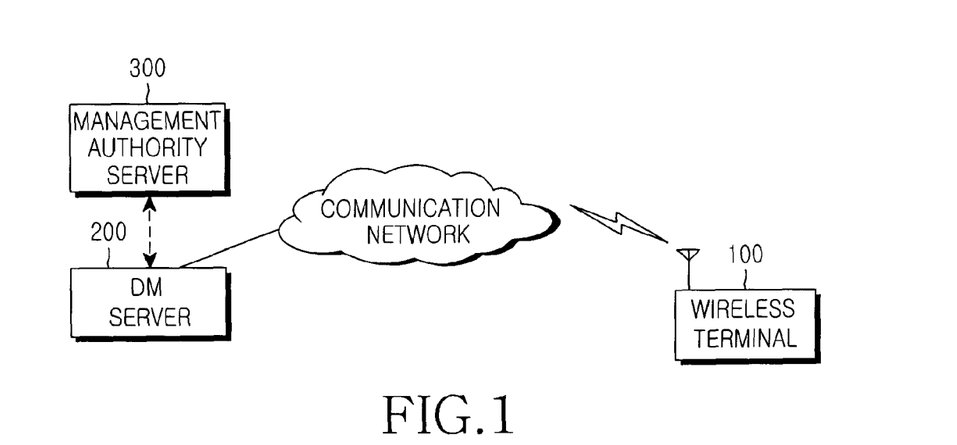
FIG. 1 is a diagram illustrating a device management system employed in exemplary embodiments of the present invention.

FIG. 1 is a diagram illustrating a device management system employed in exemplary embodiments of the present invention. Referring to FIG. 1, a device management system includes a wireless terminal 100 including a Device Management Server 200 (hereinafter, referred to as "DM server"), a Device Management client (hereinafter, referred to as "DM client"), and a Management Authority server 300 (hereinafter, referred to as "MA server").

In various situations, a specific capability of the wireless terminal 100 has been disabled by a DM system that is needed to be re-enabled for use by a user of the wireless terminal 100. One such situation is when a user is unable to resume use of the specific capability that has been previously disabled because of a failure to receive an enablement command from the DM server despite the wireless terminal 100 having left the corresponding control area. Another situation is when the user needs to use the specific capability due to work or an emergency while the wireless terminal is located in the control area. When the specific capability of wireless terminal 100 is needed the wireless terminal 100 may transfer a message to the MA server through the DM server 200 requesting enablement of the specific capability. When the request is received by the MA server 300, the MA server 300 determines the situation during which the request was generated and enables the corresponding capability of the wireless terminal as necessary or rejects the corresponding request. In this case, the wireless terminal 100 transfers an enablement request message for the corresponding capability (including additional information when necessary) using a Generic Alert message of a DM protocol (or other DM messages), or the like. The DM server 200 identifies the corresponding request message and the additional information through the MA server 300, determines if the requesting terminal meets one or more requirements for re-enabling the corresponding capability, and then transfers an enablement command or transfers a reject message to the wireless terminal. At this time, whether the DM server allows the enablement of the corresponding capability can be determined according to the following exemplary embodiments.

According to a first exemplary embodiment, when the wireless terminal 100 moves out of the control area, the DM server determines whether or not to allow the enablement of the corresponding capability using location information of the corresponding terminal.

According to a second exemplary embodiment, when the wireless terminal 100 requests the enablement of the specific capability using an authorization code for use authorization, the DM server determines whether or not to allow the enablement of the corresponding capability using the transmitted authorization code. At this time, the MA server 300 can identify if the correct authorization code is transmitted from the wireless terminal through its database.

According to a third exemplary embodiment, in an emergency, the wireless terminal 100 transmits a message requesting the enablement of the specific capability to the DM server 200. The MA server 300 determines if the wireless terminal is being used in an emergency and if it is the MA server 300 allows the enablement of the corresponding capability.

Figure 2:
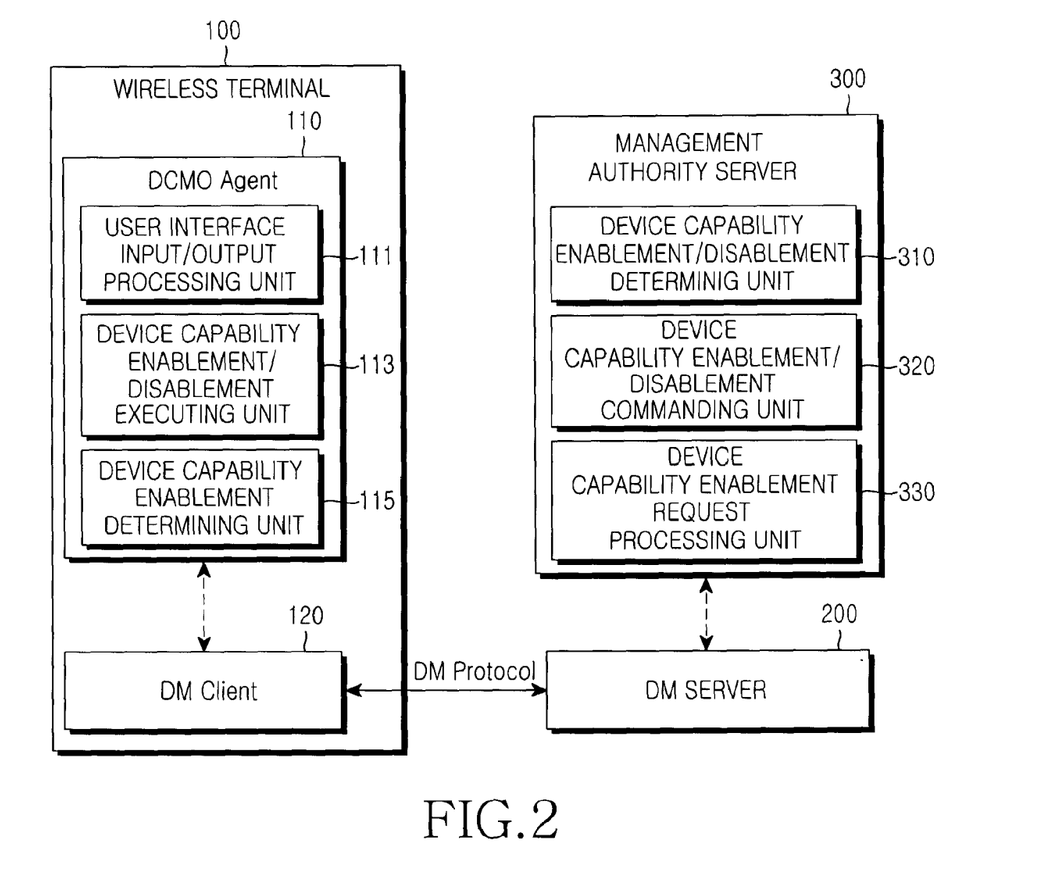
FIG. 2 is a diagram illustrating a construction of a wireless terminal and a Management Authority (MA) server.

Exemplary constructions of the described wireless terminal 100 and the MA server 300 are illustrated in FIG. 2.

FIG. 2 is a block diagram illustrating the wireless terminal and the MA server according to an exemplary embodiment of the present invention.

Referring to FIG. 2, the wireless terminal 100 includes a DCMO agent 110 and the DM client 120. The DCMO agent 110 includes a user interface input/output processing unit 111, a device capability enablement/disablement executing unit 113, and a device capability enablement determining unit 115.

The construction of the DCMO agent 110 can correspond to that of a general wireless terminal. For example, the user interface input/output processing unit 111 of the DCMO agent 110 can be implemented with a general keypad. The keypad may include a push button number dialing pad or a multi-keypad. Otherwise, the keypad may be a touch screen or a stylus. Moreover, the keypad may be detachable or a separate structure from the wireless terminal. The user interface input/output processing unit 111 receives data, notifications, or the like, from the user so as to process them.

Further, the device capability enablement/disablement executing unit 113 executes an enablement/disablement command for one or more of the capabilities of the wireless terminal. The device capability enablement/disablement executing unit 113, for example, can serve as a processor for controlling each capability of the wireless terminal.

The device capability enablement determining unit 115 determines if a condition for requesting enablement of the specific capability has been met, and if it has been met, the device capability enablement determining unit 115 transfers the enablement request to the DM client 120.

If the DM client 120 receives the enablement request for the specific capability, it generates the DM message or the Generic Alert message including the enablement request. Then, the DM client 120 transmits the generated DM message or the Generic Alert message to the DM server 200 through the DM protocol.

Further, when the DM client 120 receives the DM message from the DM server, it processes the received DM message.

For example, the DM client 120 analyzes the DM message transmitted from the DM server and determines if the enablement of the specific capability is allowed or rejected. According to the result, the DCMO agent 110 enables the corresponding capability or maintains a disabled state.

The wireless terminal 100 can include a display, a memory, a wireless module, or the like, and their constructions are omitted in FIG. 2.

Referring to FIG. 2, the MA server 300 includes a device capability enablement/disablement determining unit 310, a device capability enablement/disablement commanding unit 320, and a device capability enablement request processing unit 330.

The device capability enablement/disablement determining unit 310 determines whether to enable or disable the specific capability according to information related to a policy for the user's admission to the control area and the enablement or disablement request for the specific capability of the terminal. At this time, the device capability enablement/disablement determining unit 310 refers to information on the corresponding terminal, e.g., information on terminal's location, registration information of the terminal, or the like. The device capability enablement/disablement commanding unit 320 generates a command for controlling the corresponding capability based on the determination result in the device capability enablement/disablement determining unit 310 regarding the disablement or enablement of the corresponding capability, so as to transmit the generated command to the wireless terminal through the DM server. Further, the device capability enablement request processing unit 330 receives the enablement request of the wireless terminal 100 transmitted through the DM server so as to process it.

In the meantime, FIG. 2 illustrates that the MA server 300 and the DM server are separately constructed. However, the MA server 300 and the DM server can be unified. The fact that the configuration can be varied depending on a system operator, a system designer, or the like, is apparent to those skilled in the art.

Figure 3:
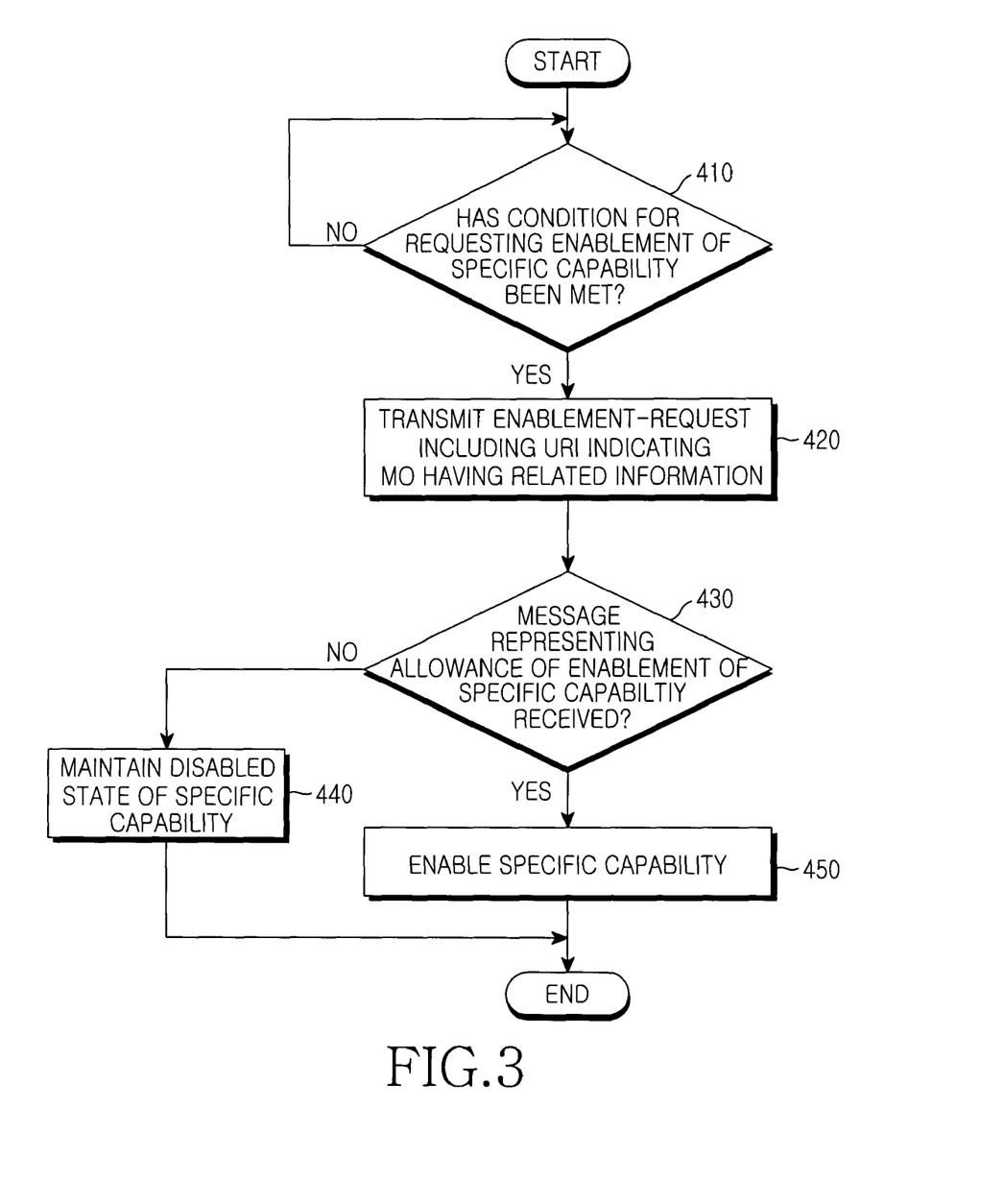
FIG. 3 is a diagram illustrating an operation of a wireless terminal according to an exemplary embodiment of the present invention.

The described wireless terminal is operated according to the control flow shown in FIG. 3. FIG. 3 is a diagram illustrating an operation of the wireless terminal according to an exemplary embodiment of the present invention.

Referring to FIG. 3, in step 410, the wireless terminal determines if the enablement request for the specific capability occurs.

According to a first exemplary embodiment, when the user is supposed to be able to use the disabled capability after the wireless terminal 100 moves out of the control area, the wireless terminal 100 determines that a condition for requesting enablement of the capability has been met. Otherwise, it is possible to set the condition for requesting enablement of the disabled capability to automatically be met when the wireless terminal 100 moves out of the control area.

According to a second exemplary embodiment, when the user inputs the authorization code for using the disabled capability within the control area, the wireless terminal 100 determines that a condition for requesting enablement of the corresponding capability has been met.

According to a third exemplary embodiment, when the emergency occurs, the wireless terminal 100 determines that a condition for requesting enablement of the corresponding capability has been met.

As such, when a condition for requesting enablement of the corresponding capability has been met, the wireless terminal 100 proceeds to step 420 and generates the enablement request including a Uniform Resource Identifier (URI) representing a Management Object (MO) having the related information.

Figure 4:
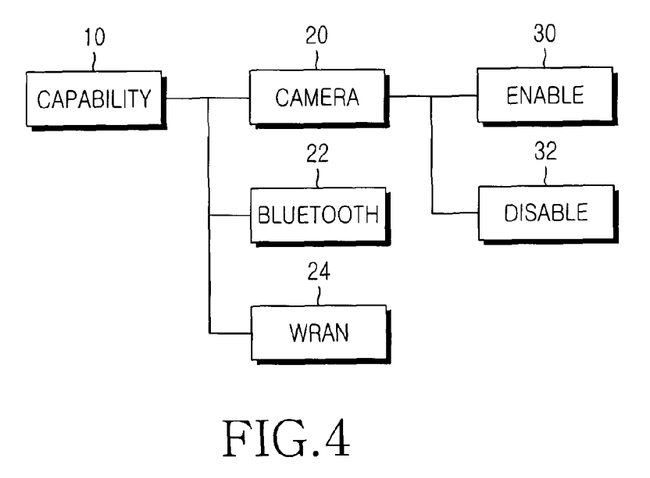
FIG. 4 is a diagram illustrating a DM tree structure in an OMA DM.

FIG. 4 illustrates a DM tree structure in which the MOs corresponding parameters and objects for managing the capabilities of the wireless terminal serve as entities.

Referring to FIG. 4, the parameters for managing the capabilities of the wireless terminal, i.e., the MOs, are stored in a storage device of the wireless terminal, in which a data storing structure comprises the DM tree. The entities of the DM tree are the MOs. The exemplary DN tree illustrated in FIG. 4 includes Capability 10, Camera 20, Bluetooth 22, WRAN 24, Enable 30 and Disable 32. Herein, Camera 20, Bluetooth 22, WRAN 24 are exemplary capabilities and Enable 30 and Disable 32 are exemplary parameters for the Camera 20 capability.

The DM server refers to the URI indicating the MO and controls the capabilities of the terminal. Therefore, the enablement request includes the URI indicating the MO having information on the capability to be controlled.

The enablement request is included in the existing DM message or the Generic Alert message and is transmitted to the DM server.

That is, the wireless terminal generally uses the Generic Alert message on the DM protocol for transferring the specific message to the DM server. The Generic Alert message can include a source LocURI, Meta, Data, or the like.

Figure 5:
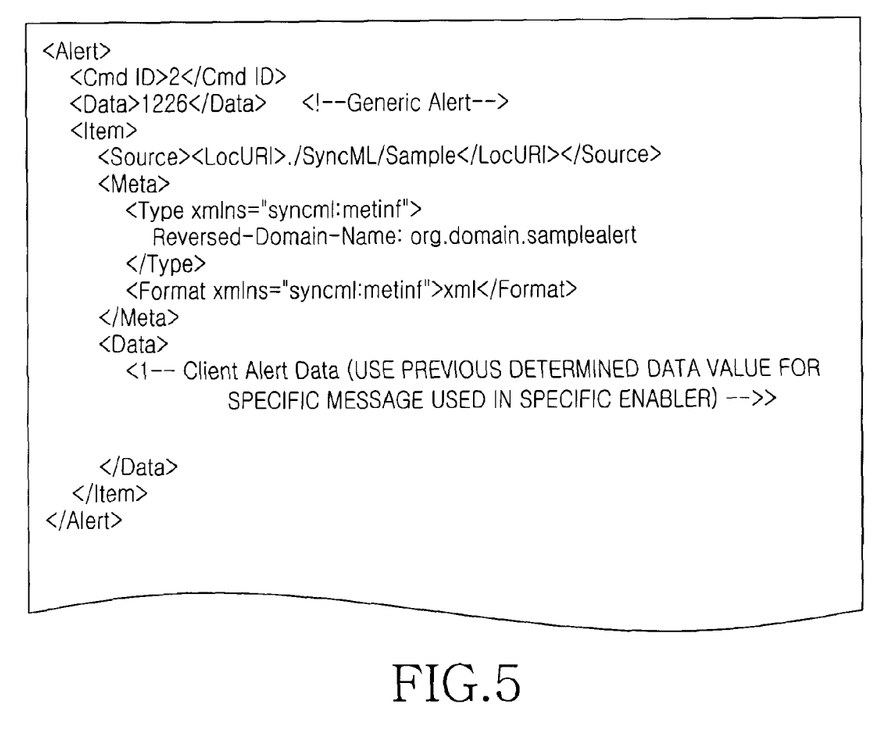
FIG. 5 is a diagram illustrating an example of a Generic Alert message defined in the OMA DM standard.

FIG. 5 is a diagram illustrating an example of the Generic Alert message defined in the OMA DM standard, the entire disclosure of which is hereby incorporated by reference.

Referring to FIG. 5, the LocURI value may indicate a location of a node on the MO to be referred to in the Generic Alert, and the Meta value may define the type and the format of the Generic Alert Data. Further, regarding the Data value, the Alert Data value may be defined and used by each DM enabler as needed. For example, if the Data value indicating the enablement request message is defined as '201' and '201' is input into the Data value and transmitted, this defined Data value represents a message requesting the enablement of the corresponding capability by the client of the terminal. Therefore, the value defining the request for the enablement of the specific capability to the server is input as the Generic Alert Data value. Then, when it is necessary to transfer additional information, the Generic Alert Data value is stored in the MO, and the URI of the MO having the corresponding additional information is then transferred together with the Alert Data, so that the terminal can request the enablement from the server.

In summary, when the user requests the enablement of the specific capability of the terminal through the URI, the wireless terminal establishes the DM session with the DM server and transfers the Generic Alert Message. At this time, the wireless terminal defines, in advance, the value representing the request for re-enabling the capability of the terminal (i.e. '201' according to the above example) and inserts the defined value into the Generic Alert Data value so as to transfer it. Further, when necessary, the Generic Alert message can include the LocURI representing the location of the MO having the additional information, such as the terminal's location information. In this case, the DM server and the MA server (which may be constructed in one physical server) identifies the Generic Alert, recognizes that the corresponding terminal requests the re-enablement of the device capability, determines whether to enable the corresponding capability or reject the corresponding request using the LocURI information having the additional information, or the like, based on the determination of the server, and then transfers the corresponding DM message to the terminal. The determination of the server can made using a stored record indicating that the server intended to re-enable the device capability by establishing the DM session with the server but failed, the location information of the current terminal, or the like. At this time, the LocURI included in the Generic Alert message transferred to the DM server by the terminal indicates the specific capability of the terminal so as to designate the specific capability for enabling. Otherwise, i.e. when the LocURI is not included in the Generic Alert message transferred to the DM server by the terminal, it can be determined that the re-enablement of every capability of the terminal is requested. In this case, the server determines the enablement request message, i.e., if the LocURI is included in the Generic Alert message. If the LocURI is included in the Generic Alert message, the server enables the corresponding capability, and if it is not, the server can enable all capabilities of the terminal.

Referring to FIG. 3 again, the wireless terminal 100 transmits the DM message or the Generic Alert message representing the enablement request for the specific capability. Then, in step 430, the wireless terminal 100 determines whether or not a message indicating the allowance of the enablement of the specific capability is received from the DM server 200.

If the wireless terminal 100 receives the message allowing the enablement of the specific capability from the DM server 200, it enables the specific capability in step 450. If the wireless terminal 100 does not receive the message indicating the allowance of the enablement of the specific capability from the DM server 200, or receives a message disallowing the enablement of the specific capability, it proceeds to step 440 so as to maintain the disabled state of the specific capability.

The message flows between the wireless terminal and the DM server according to a first to third exemplary embodiments of the present invention will be described with reference to FIGS. 6 to 8.

Figure 6:
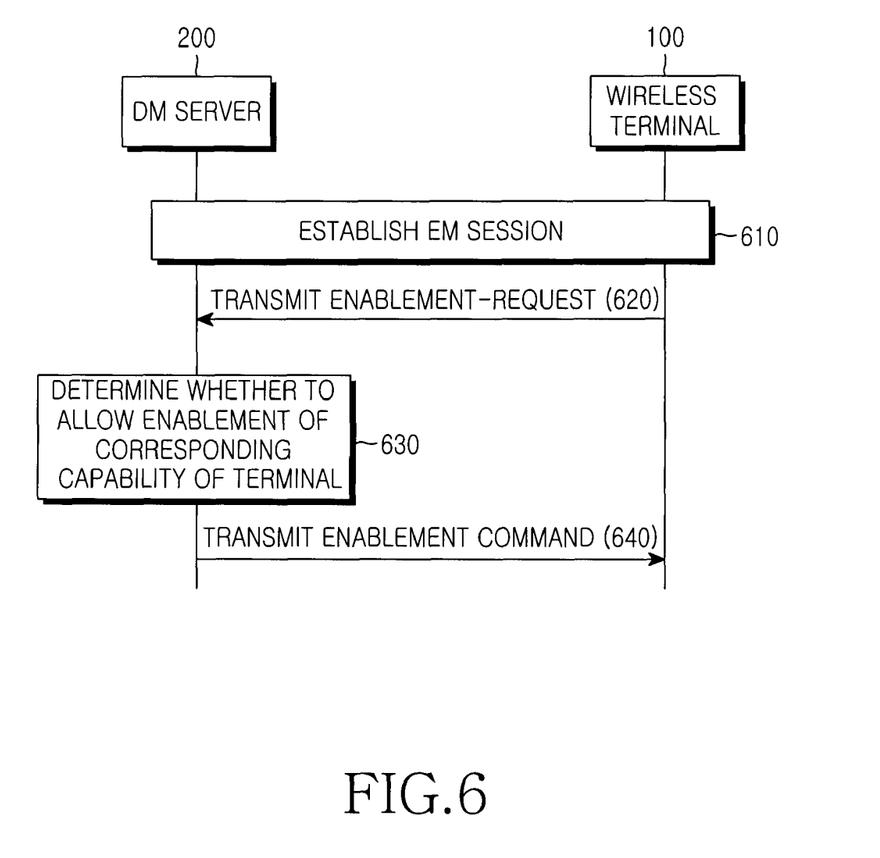
FIG. 6 is a diagram illustrating a message flow between a wireless terminal and a DM server according to a first exemplary embodiment of the present invention.

FIG. 6 is a diagram illustrating the a message flow between the wireless terminal and the DM server according to the first exemplary embodiment of the present invention.

First, it assumes that the wireless terminal is in the disabled state disallowing the use of a specific device capability even though the wireless terminal has moved out of the control area.

Referring to FIG. 6, the wireless terminal 100 includes an indication that the corresponding capability is disabled by the specific DM server so as to not be available. Subsequently, when the user requests enablement of the corresponding capability, the wireless terminal establishes the session with the corresponding DM server 200 in step 610.

Then, the wireless terminal 100 transmits the alert data requesting the re-enablement of the capability disabled by the DM server to the DM server by using the Generic Alert data or the DM message in step 620. The Generic Alert message can include the URI selecting and designating the specific capability, the URI indicating the location of the MO having the information that may be used for enabling the corresponding capability of the terminal by the DM server, or the like, as necessary.

Then, the DM server 200 receives the corresponding Alert Data or the message, and then identifies if it is okay to enable the corresponding capability of the terminal using the additional information or other methods through the MA server (not shown) in step 630. Herein, the MA sever may verify that the terminal is not located in the control area. At this time, the MA server can use the information on the location of the wireless terminal 100. Further, through comparison with the previous record of the enablement attempt failure or the like, the MA server can identify the departure of a corresponding terminal from its control area, thereby identifying that the MA server had attempted to enable the corresponding capability of the terminal but failed. Then, when the DM server 200 receives the message indicating the state in which the capability of the terminal can be enabled from the MA server, the DM server transmits the DM message for re-enabling the corresponding capability to the terminal through the DM session in step 640. As a result, the terminal receives the DM message so as to re-enable the corresponding capability.

Figure 7:
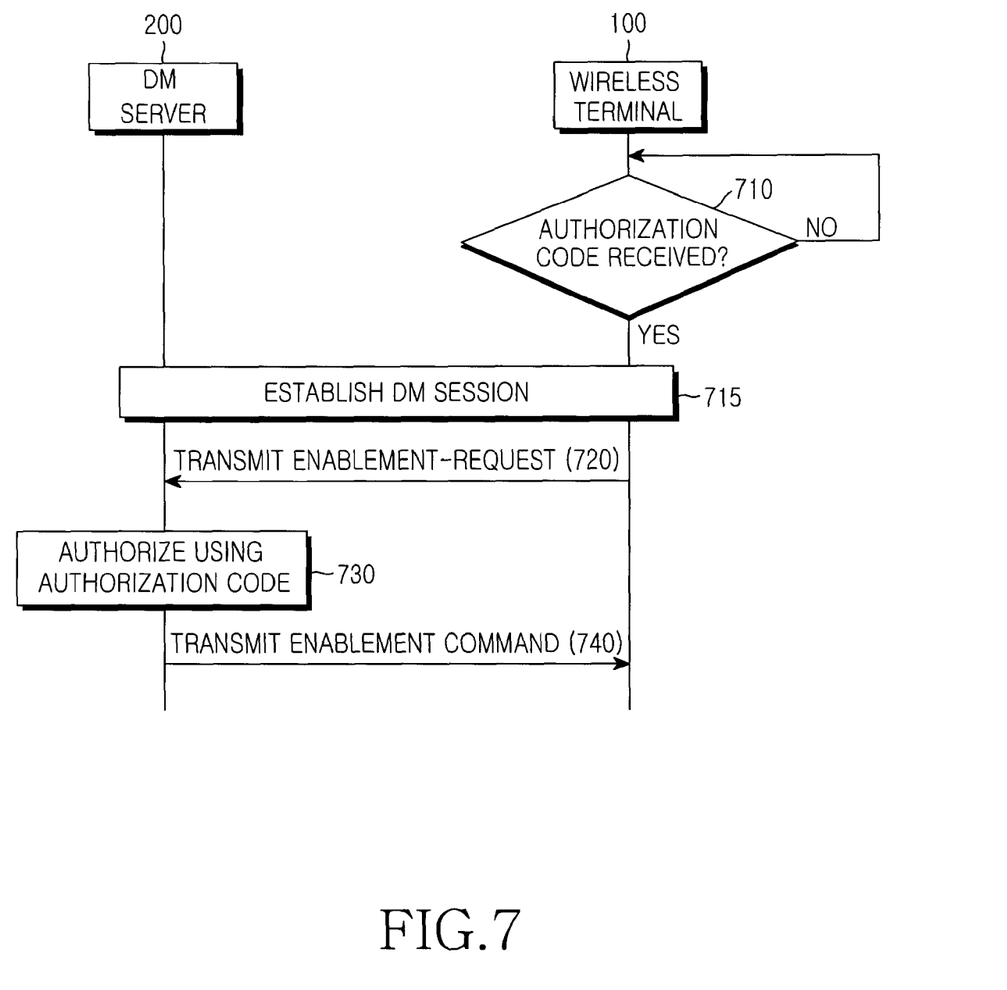
FIG. 7 is a diagram illustrating a message flow between a wireless terminal and a DM server according to a second exemplary embodiment of the present invention.

FIG. 7 is a diagram illustrating a message flow between the wireless terminal and the DM server according to the second exemplary embodiment of the present invention.

First, it is assumed that the wireless terminal is located in the control area so as to be in the disabled state thereby disallowing the use of the specific device capability.

Referring to FIG. 7, when the user wishes to use the disabled capability in the control area, the user inputs an authorization code for allowing the use of the corresponding capability through a supervisor or an authorizer to the wireless terminal 100. For example, when the user intends to enable the camera function for work, the user requests that the supervisor or the authorizer in the corresponding control area give the user the authorization code for enabling the camera function.

That is, when the user inputs the authorization code having the corresponding authorization through the UT, the wireless terminal 100 receives the authorization code in step 710. Herein, the authorization code can be a password.

Subsequently, the wireless terminal 100 establishes the DM session with the DM server in step 715 so as to request the re-enabling of the disabled corresponding capability using the Generic Alert message or the DM message.

The wireless terminal 100 stores the value of the corresponding authorization code to the specific node in the DCMO and transmits the enablement request message to the DM server using the Generic Alert message or the DM message including the Alert Message requesting the enablement of the corresponding capability together with the URI indicating the MO having the value of the corresponding authorization code. At this time, the value of the authorization code can be directly included instead of the URI indicating the value of the authorization code. The authorization code is a value that the MA server has in its database and can be transferred to the user requiring the use of the corresponding capability by the supervisor, or the like, having the authorization for enabling the corresponding capability in the control area. For example, the code, '#0349829' is set for the authorization code representing the authorization for use of the camera function of the terminal, the code '#0349829' is stored in the database of the MA server. Then, the user requiring the use of the camera function within the corresponding control area receives the corresponding code from the related supervisor in the corresponding area, inputs the corresponding code, and transfers the corresponding code to the DM server so as to re-enable the corresponding capability.

Then, the DM server 200 receives the enablement request message in step 720, and when the MA server authorizes the code value indicating the corresponding URI in step 730, the MA server transfers the DM message enabling the corresponding capability of the terminal to the terminal in step 740. If it fails to authorize the authorization code, the MA server transfers a rejection message to the terminal. Here, the corresponding authorization code can be changed by a system manager at any time.

The above described method can simplify the entire process when there are a large number of corresponding terminals, in comparison with the case where information on the terminal is input to the DM server one by one whenever the user's terminal having the authority for using the corresponding capability occurs so that the DM server transfers the enablement command.

According to another exemplary embodiment, when the DM server disables the corresponding capability of the terminal, the value of the authorization code capable of re-enabling the disabled capability or a hash value capable of authorizing the authorization code can be stored in advance to a specific node of the DCMO of the terminal. Later on, when the user inputs the authorization code, the wireless terminal does not establish the DM session with the DM server and authorizes the authorization code using the value of the corresponding value, so as to re-enable the corresponding capability. At this time, the value of the corresponding code should not be read by the user of the terminal.

Figure 8:
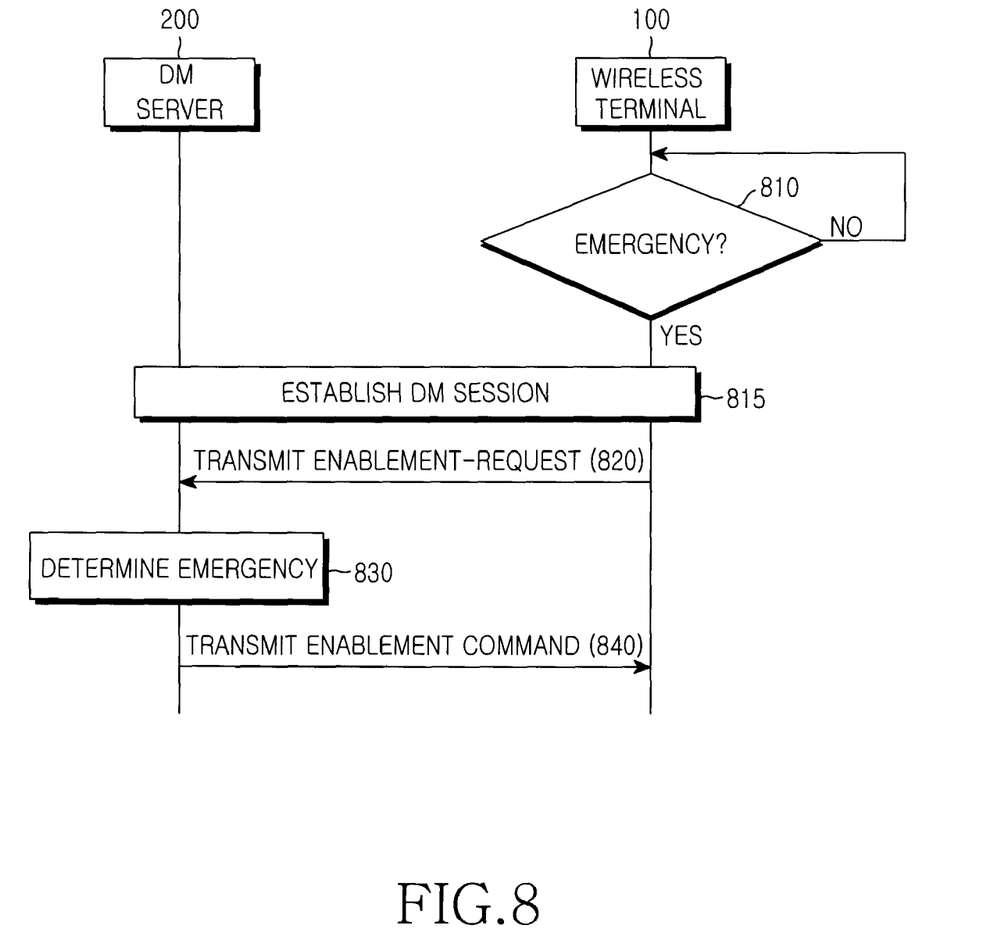
FIG. 8 is a diagram illustrating a message flow between a wireless terminal and a DM server according to a third exemplary embodiment of the present invention.

FIG. 8 is a diagram illustrating a message flow between the wireless terminal and the DM server according to a third exemplary embodiment of the present invention. In the event of an emergency, the specific capability of the terminal should be available. For example, the case may occur where the DM system disables the GPS apparatus or the WLAN-related function of the terminal within the control area for a specific reason. At this time, when an emergency situation occurs, the user obtains the information on the location of the user's terminal by using the GPS apparatus and transmits the location information to an urgent care center. Otherwise, when the user cannot use the GPS apparatus or is indoors, the user can obtain the information on the location of the user's terminal by using the WLAN, or the like, and transfers the obtained location information to the urgent care center.

Referring to FIG. 8, the wireless terminal 100 determines if an emergency occurs in step 810. For example, the occurrence of an emergency can be determined by detecting an emergency telephone number (e.g., 911) dialed during a call origination. When the wireless terminal 100 determines that there is an emergency, the wireless terminal establishes the session with the DM server in step 815. Subsequently, the wireless terminal 100 can transfer the request message requesting the enablement of the disabled capabilities of the terminal to the DM server using the Generic Alert message or DM message, in step 820. At this time, if necessary, an indicator informing of the emergency is stored in the MO of the user's terminal. When the user sends the enablement request message to the DM server, the message can include the URI indicating the MO in which the indicator informing of the emergency is stored. Otherwise, a general enablement request message and another enablement request message informing of the emergency are separately defined and can be sent in the Generic Alert message.

Then, the DM server 200 determines if the current situation is an emergency through the MA server in step 830. As described above, the emergency can be determined through call origination according to the telephone number of the emergency call or a notification of occurrence of the urgent situation from a disaster management center. Otherwise, when the emergency occurs, every capability of the terminal can be shifted from the disabled state to the enabled state. When the emergency occurs, the DM server 200 transfers the DM message enabling the capability of the corresponding terminal to the terminal in step 840.

As described above, when the corresponding capability is disabled by the DM server, the user can request the enablement of the specific capability to the DM server using the terminal. The DM server identifies the message and the corresponding additional information and determines whether or not to provide the enablement command with the corresponding terminal, so that the DM server can re-enable the corresponding capability of the terminal. Therefore, when the user wishes to use the corresponding capability of the terminal, the user can directly request the enablement of the corresponding capability to the DM server and obtain the authorization for use of the corresponding capability if the situation is allowed under the policy of the management authority server.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for enabling a capability of a terminal in a device management system including a server capable of at least one of enabling and disabling capabilities of the terminal, the method comprising:
   determining, by the terminal, if a condition has been met for requesting enablement of a disabled capability of the terminal;
   transmitting a request message from the terminal to the server, wherein the request message is for requesting the enablement of the disabled capability and includes information related to the condition, based on a result of the determining by the terminal; and
   receiving, by the terminal, a control command for the disabled capability from the server to process the control command,
   wherein a current disabled state of the disabled capability is set by the server,
   wherein the information related to the condition includes an authorization code, the authorization code corresponding to the condition that has been met for the requesting of the enablement of the disabled capability from among a plurality of conditions, for requesting the enablement of the disabled capability,
   wherein the request message includes a resource identifier indicating a location on a Device Management (DM) tree of a node including the authorization code used for requesting enablement of the disabled capability, and
   wherein the request message includes a generic alert message.

2. The method as claimed in claim 1, wherein the request message includes a Device Management (DM) message.

3. The method as claimed in claim 1, wherein the request message further includes an identifier indicating a location on a Device Management (DM) tree of a node including additional information used for requesting enablement of the disabled capability.

4. The method as claimed in claim 1, wherein the Generic Alert message includes data indicating additional information used for requesting enablement of the disabled capability.

5. The method as claimed in claim 1, wherein the condition for requesting enablement of the disabled capability is met if a request for enablement of the disabled capability is made by a user of the terminal.

6. The method as claimed in claim 1, wherein the condition for requesting enablement of the disabled capability is automatically met when one or more preset requirements are met.

7. The method as claimed in claim 6, wherein the one or more preset requirements include a terminal exiting a control area and an occurrence of an emergency communication.

8. The method as claimed in claim 1, wherein the enablement request includes a message requesting enablement of every capability of the terminal.

9. A terminal for enabling a disabled capability in a device management system including a server for at least one of enabling and disabling capabilities of the terminal, the terminal comprising:
   a device capability enablement determining unit for determining if a condition has been met for requesting enablement of the disabled capability of the terminal; and
   a Device Management (DM) client configured to:
      receive a notification of the condition being met for requesting enablement of the disabled capability from the device capability enablement determining unit when the condition has been met,
      generate a request message for requesting the enablement of the disabled capability based on the result of the determining, and
      transmit the generated request message from the terminal to the server, the
   generated request message including information related to the condition to the server,
   wherein a current disabled state of the disabled capability is set by the server,
   wherein the information related to the condition includes an authorization code, the authorization code corresponding to the condition that has been met for the requesting of the enablement of the disabled capability from among a plurality of conditions, for authorizing the enablement of the disabled capability,
   wherein the request message includes a resource identifier indicating a location on a Device Management (DM) tree of a node including the authorization code used for requesting enablement of the disabled capability, and
   wherein the request message includes a generic alert message.

10. The terminal as claimed in claim 9, wherein the request message includes a DM message.

11. A server executing management of a capability of a terminal in a device management system, the server comprising:
   an enablement request processing unit for receiving a request message transmitted from the terminal to the server, the request message being for requesting an enablement of a capability of the terminal when the terminal determines that a condition for requesting the enablement of the capability of the terminal has been met;
   a device capability determining unit configured to:
      determine at least one of enablement and disablement of the capability, and
      determine whether or not to enable the capability when receiving the request message, and
   a device capability commanding unit configured to:
      generate a command for at least one of enablement and disablement of the capability,
      generate a command for controlling the capability based on a determination result in the device capability determining unit regarding whether or not to allow the enablement of the capability, and
      transmit the generated command to the terminal,
   wherein a current disabled state of the disabled capability is set by the server,
   wherein the request message includes information on the condition, wherein the information on the condition includes an authorization code, the authorization code corresponding to the condition that has been met for the requesting of the enablement of the disabled capability from among a plurality of conditions, for authorizing the enablement of the disabled capability, wherein the request message includes a resource identifier indicating a location on a Device Management (DM) tree of a node including the authorization code used for requesting enablement of the disabled capability, and wherein the request message includes a generic alert message.

\* \* \* \* \*